T. M. LILLISTON.
PEANUT PICKER.
APPLICATION FILED MAY 22, 1911.

1,017,570.

Patented Feb. 13, 1912.
5 SHEETS—SHEET 1.

WITNESSES

INVENTOR
Thomas M. Lilliston
By E. E. Trosman, Attorney.

T. M. LILLISTON.
PEANUT PICKER.
APPLICATION FILED MAY 22, 1911.

1,017,570.

Patented Feb. 13, 1912.
5 SHEETS—SHEET 2.

WITNESSES

INVENTOR
Thomas M. Lilliston
By E. E. Vrooman, Attorney

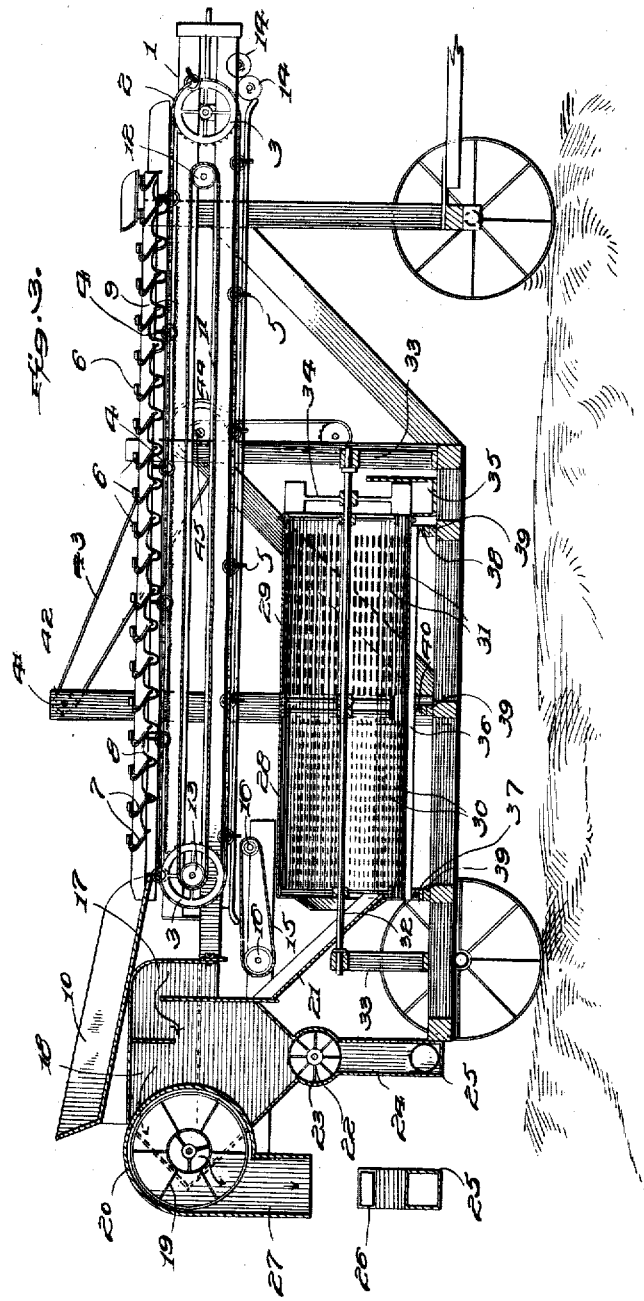

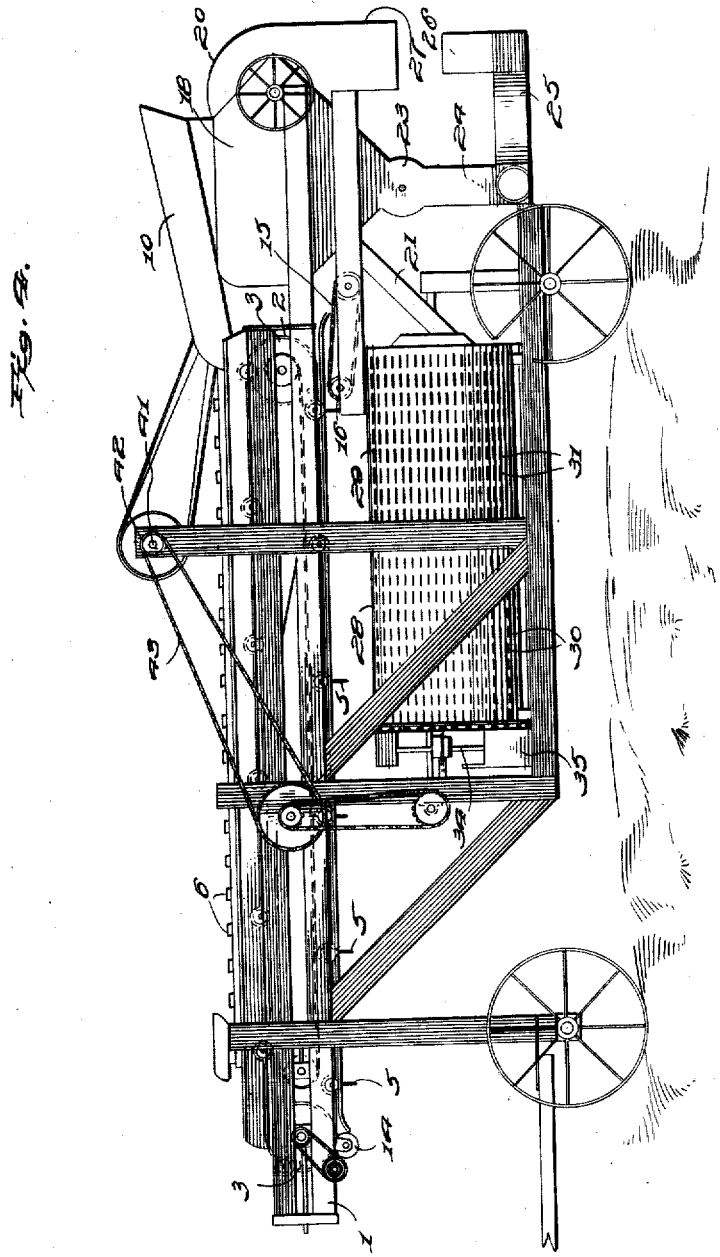

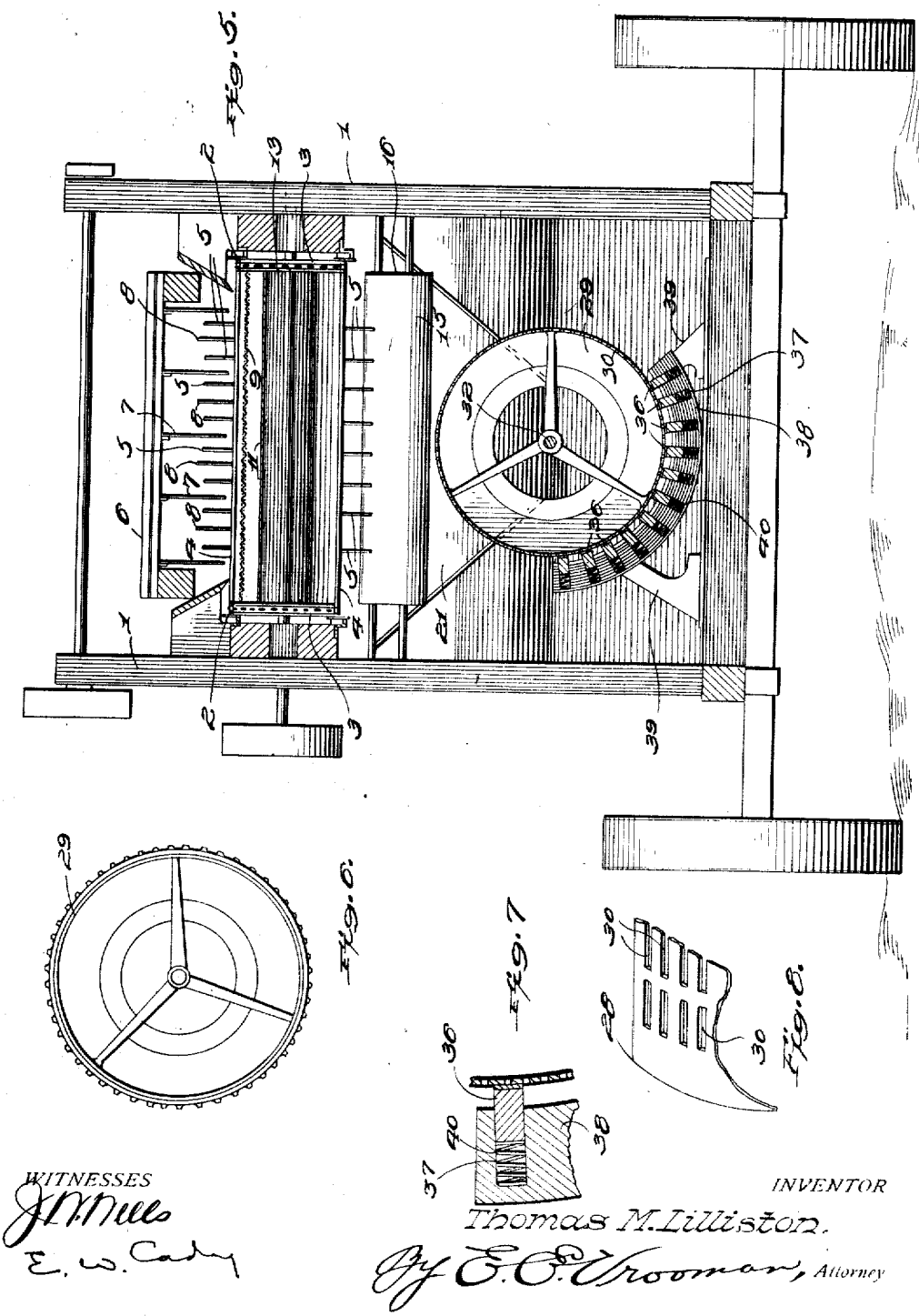

UNITED STATES PATENT OFFICE.

THOMAS MILICUT LILLISTON, OF SUFFOLK, VIRGINIA.

PEANUT-PICKER.

1,017,570.   Specification of Letters Patent.   Patented Feb. 13, 1912.

Application filed May 22, 1911. Serial No. 628,692.

*To all whom it may concern:*

Be it known that I, THOMAS MILICUT LILLISTON, a citizen of the United States, residing at Suffolk, in the county of Nansemond and State of Virginia, have invented certain new and useful Improvements in Peanut-Pickers, of which the following is a specification, reference being had therein to the accompanying drawings.

This invention relates to machines for separating peanuts from the vines and for removing the dirt therefrom, cutting the stems from the nuts and delivering the peanuts picked, stemmed, and cleaned into suitable receptacles with the vines separately delivered for use as cattle feed.

The invention has for its object to provide an improved machine of this kind constructed and arranged as hereinafter set forth and claimed.

Figure 1:
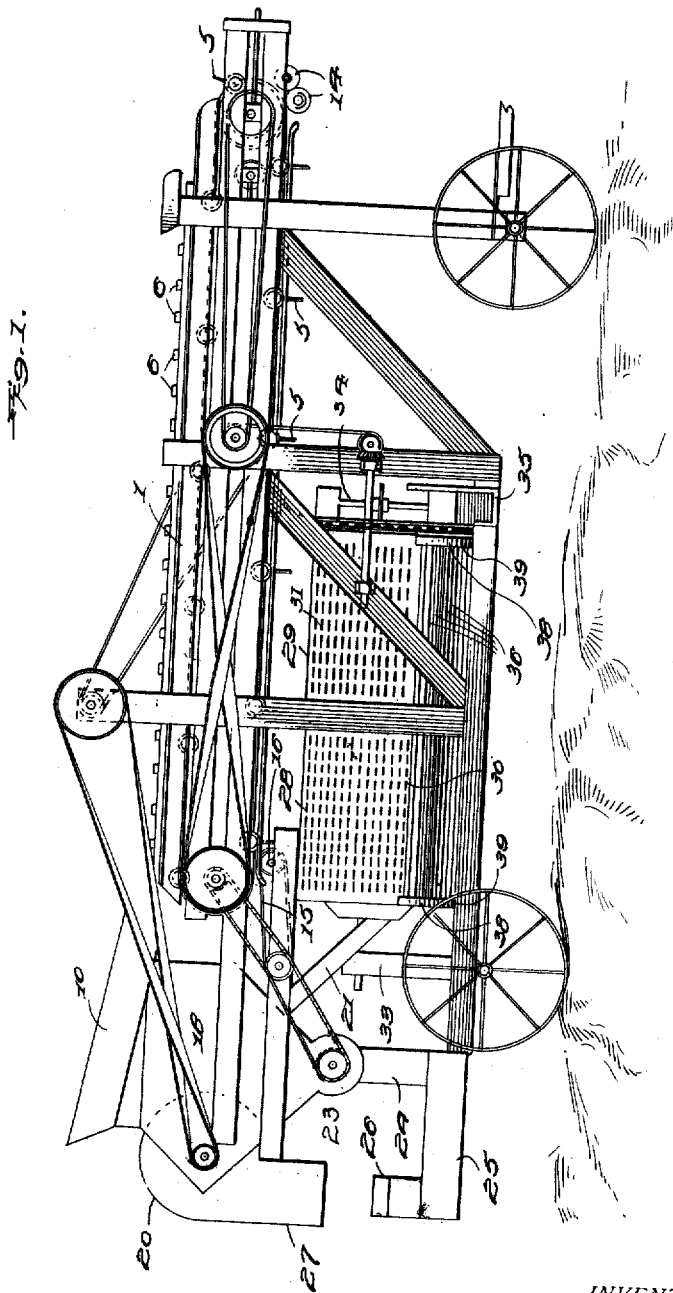
Figure 2:
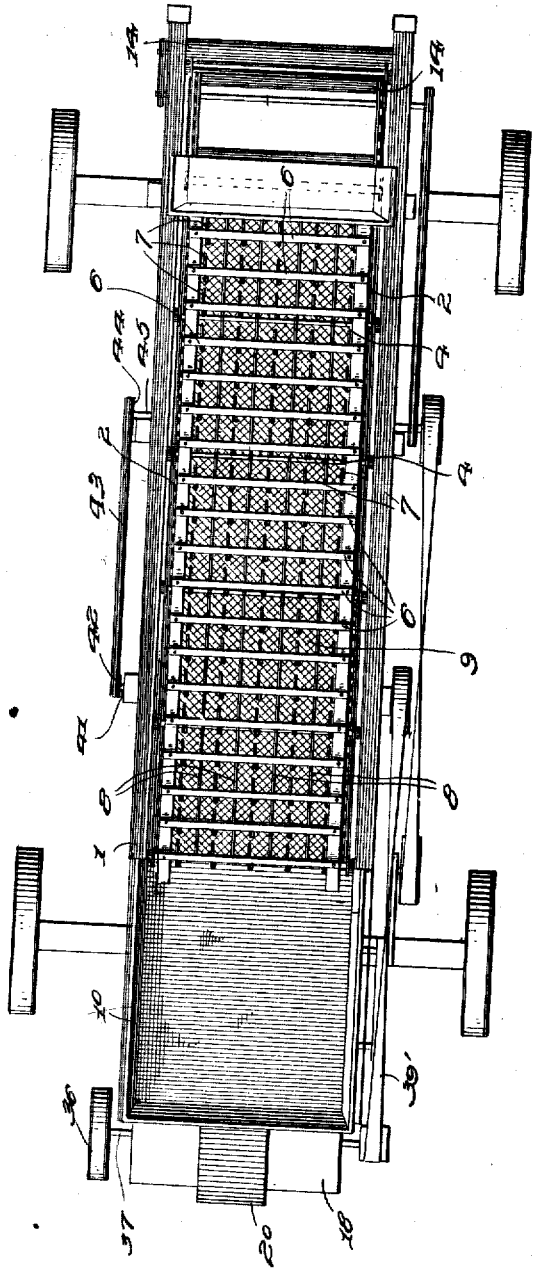

Referring to the accompanying drawings:—Figure 1 is a side view of a machine for separating peanuts from the vines which is constructed in accordance with this invention. Fig. 2 is a plan view thereof. Fig. 3 is a view in longitudinal section of the machine. Fig. 4 is a side view of the machine on the opposite side from that shown in Fig. 1. Fig. 5 is an enlarged view in cross section thereof. Fig. 6 is a detail end view of the rotary cylinder for separating the stems from the peanuts and cleaning the same. Fig. 7 is an enlarged detail view in vertical section of a portion of the cylinder for removing the stems and a portion of the device for cutting off the stems. Fig. 8 is a detail view in perspective of a portion of the periphery of the cylinder for separating the stems from the peanuts.

On the upper part of the frame 1 of the machine which is mounted on wheels is an endless belt 2 which extends over toothed wheels 3 on the frame 1 and is provided with transverse slats located apart from each other, each of the slats 4 being provided with a row of vertical pins 5, preferably of irregular length, the several parts being more particularly shown in Figs. 2, 3, and 5, and located at intervals apart from end to end of the top of the frame of the machine are transverse bars 6 each having a row of depending spring like projections 7 which are located at intervals between the pins 5. Mounted above and extending transversely to the bars 4 are several iron rods 8 which from end to end are of an undulating shape and which coöperate with the pins 5 and the depending spring like projections 7 to separate the peanuts from the vines.

Below the top flight of the endless belt 2 is provided a wire netting 9 secured beneath the transverse slats 4. Located at the rear end of the machine and at the end of the endless belt 2 is a hopper 10 on which the vines which have been dug up are fed to the endless belt 2. The vines being fed to the endless belt 2 are carried forward from the same beneath the spring like projections 7 and the peanuts are separated from the vines in passing between said projections. The vines being brought to the forward end of the machine are delivered off of the end of the endless belt 2 while the peanuts with the stems and dirt adhering thereto are carried on to an endless belt 11 which may be made of cotton cloth and are carried by the endless belt 11 which moves in the opposite direction to the belt 2, the endless belt 11 being mounted on a pulley 12 at one end and on a pulley 13 at the other end which is mounted on the shaft of the toothed pulley 3. Should any of the vines not be carried off of the endless belt 2 they will be caught up by the rollers 14 located adjacent to the toothed pulley 3 and will be carried thereby to the ground.

Located beneath the toothed pulley 3 is an endless belt 15 mounted on pulleys 16 and the peanuts and dirt carried by the plate 11 are delivered on to the endless belt 15 and the trash is carried to the passage way 17 of the hopper shaped casing 18 by means of a suction fan 19 located in the casing 20 opening into the hopper shaped casing 18. The peanuts and heavier matter fall into the inclined chute 21 while the lighter stuff is sucked into the casing 18 by means of the fan 19 and is drawn down by means of the fan 22 in the casing 23 at the apex of the casing 18 into the depending chute 24 to a chamber 25 having a lateral opening through which the trash is discharged.

The casing 25 is provided with a vertical passage way 26, open at its upper end and located at a spaced distance from the opening of the passage way 27 leading from the fan casing 20. By means of this construction the air passing downward through the passage way 27 into the passage way 26 will not be so strong as to drive the collected matter in the casing 25 through the passage way 24 into the casing 18. The inclined chute 21 projects into the open end of a rotary cylinder formed in two sections 28 and 29, the section 28 being formed with small apertures 30 in its periphery, and the section 29 being formed with larger apertures 31 in its periphery.

The rotary cylinder is mounted on a shaft 32 having its bearings in uprights 33 and has mounted upon it outside of one end of the cylinder a fan 34, the leaves of which move through a gutter 35. The peanuts having been delivered into the rotary cylinder from the inclined shaft 21 are rolled and tumbled about in the sections of the rotary cylinder and the dirt drops through the perforations 30 in the first section of the cylinder while the larger trash and remaining dirt drops through the larger perforations 31 in the second section of the cylinders, the dirt being removed from the peanuts by attrition in the cylinder thereby cleaning the peanuts. The stems of the peanuts protruding through the perforations as the cylinder rotates are cut off by means of steel edged blades 36 located in sockets 37 in a curved support 38 mounted on brackets 39 adjacent to the periphery of the cylinder, said knives 36 being yieldingly mounted on springs 40 so as to be held by yielding pressure against the periphery of the cylinder. It will be seen that by means of this construction as the cylinder rotates the peanut stems projecting through the apertures in its periphery will be cut off by the knives 36. The peanuts, now being separated from the trash, the stems and dirt, are fed over into the trough 35 and conveyed by the fan 34 out of the trough into suitable receptacles.

What I claim is:—

1. In a machine of the character described, an endless belt having transverse rows of picker pins, transverse rows of picker pins located above said endless belt and coöperating with the picker pins on the endless belt, a second endless belt located within the first named endless belt and movable in the opposite direction, a third endless belt located adjacent to one end of the second named belt and adapted to receive the peanuts separated from the vines.

2. In a machine of the character described, an endless belt having transverse rows of picker pins, transverse rows of picker pins located above said endless belt, and coöperating with the picker pins on the endless belt, a second endless belt located within the first named endless belt and movable in the opposite direction, a third endless belt located adjacent to one end of the second named endless belt for receiving peanuts separated from the vines, an inclined chute adjacent to one end of said last named belt.

3. In a machine of the character described, an endless belt having transverse rows of picker pins, transverse rows of picker pins, and longitudinal undulating wires located above said endless belt and coöperating with the picker pins thereon In testimony whereof I hereunto affix my signature in presence of two witnesses.

THOMAS MILICUT LILLISTON.

Witnesses:
WILLIAM MAHONE CRUMPEN,
RUTH ESTELLE HOWELL.